US012568246B2

(12) United States Patent
Kim et al.

(10) Patent No.: US 12,568,246 B2
(45) Date of Patent: Mar. 3, 2026

(54) METHOD, APPARATUS, AND SYSTEM FOR PROVIDING ZOOMABLE STEREO 360 VIRTUAL REALITY VIDEO

(71) Applicant: Electronics and Telecommunications Research Institute, Daejeon (KR)

(72) Inventors: Sung-Hoon Kim, Daejeon (KR); Seongwon Jung, Busan (KR); Dongho You, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 133 days.

(21) Appl. No.: 18/451,577

(22) Filed: Aug. 17, 2023

(65) Prior Publication Data

US 2024/0146962 A1 May 2, 2024

(30) Foreign Application Priority Data

Oct. 31, 2022 (KR) ........................ 10-2022-0143033

(51) Int. Cl.
*H04N 19/597* (2014.01)
*H04N 13/351* (2018.01)
(Continued)

(52) U.S. Cl.
CPC ......... *H04N 19/597* (2014.11); *H04N 13/351* (2018.05); *H04N 13/398* (2018.05);
(Continued)

(58) Field of Classification Search
CPC ............... H04N 19/597; H04N 13/351; H04N 13/398; H04N 19/184; H04N 19/30;
(Continued)

(56) References Cited

U.S. PATENT DOCUMENTS

| | | | |
|---|---|---|---|
| 8,645,562 | B2 | 2/2014 | Thang et al. |
| 10,313,414 | B2 | 6/2019 | Thang et al. |

(Continued)

FOREIGN PATENT DOCUMENTS

| | | |
|---|---|---|
| KR | 10-1829064 | 2/2018 |
| KR | 10-2019-0107666 | 9/2019 |

(Continued)

OTHER PUBLICATIONS

You et al. "MPEG-DASH MPD for Tile-based Hybrid Stereoscopic 360-degree Video Streaming", 2018 Tenth International Conference on Ubiquitous and Future Networks (ICUFN), Jul. 3-6, 2018, IEEE (Year: 2018).*

(Continued)

*Primary Examiner* — Richard A Hansell, Jr.
(74) *Attorney, Agent, or Firm* — KILE PARK REED & HOUTTEMAN PLLC

(57) ABSTRACT

A method, apparatus, and system for providing a zoomable stereo 360 virtual reality (VR) video are provided. The method includes receiving media presentation description (MPD) information including information on video bit streams obtained by encoding each piece of video data by different conditions, decoding a video bit stream corresponding to a communication environment of a client device based on the MPD information and outputting a streaming video, receiving a user's resizing input for the streaming video, and decoding a video bit stream corresponding to the resizing input and outputting an adjusted streaming video.

19 Claims, 5 Drawing Sheets

(51) Int. Cl.

| | |
|---|---|
| ***H04N 13/398*** | (2018.01) |
| ***H04N 19/184*** | (2014.01) |
| ***H04N 19/30*** | (2014.01) |
| ***H04N 19/59*** | (2014.01) |

(52) U.S. Cl.
CPC .......... *H04N 19/184* (2014.11); *H04N 19/30* (2014.11); *H04N 19/59* (2014.11)

(58) Field of Classification Search
CPC .... H04N 19/59; H04N 13/161; H04N 13/139; H04N 13/178
See application file for complete search history.

(56) References Cited

U.S. PATENT DOCUMENTS

| | | | | |
|---|---|---|---|---|
| 2014/0002598 | A1* | 1/2014 | Kim | H04N 21/816 348/43 |
| 2019/0014350 | A1* | 1/2019 | Wang | H04N 21/84 |
| 2020/0154092 | A1* | 5/2020 | Jang | H04N 13/194 |
| 2020/0278828 | A1* | 9/2020 | Murtaza | G02B 27/0093 |
| 2021/0084096 | A1* | 3/2021 | Song | H04N 21/816 |
| 2021/0201855 | A1* | 7/2021 | Kammachi-Sreedhar | H04N 13/183 |
| 2023/0093377 | A1* | 3/2023 | Skupin | H04N 13/117 348/43 |

FOREIGN PATENT DOCUMENTS

| | | |
|---|---|---|
| KR | 10-2024642 | 9/2019 |
| KR | 10-2021-0027543 | 3/2021 |
| KR | 10-2228062 | 3/2021 |

OTHER PUBLICATIONS

You et al. "MPEG-DASH MPD for Tile-based Hybrid Stereoscopic 360-degree Video Streaming", 2018 Tenth International Conference on Ubiquitous and Future Networks (ICUFN), Jul. 3-6, 2018, IEEE (See IDS Aug. 17, 2023) (Year: 2018).*

D'Acunto et al. "Using MPEG DASH SRD for zoomable and navigable video", May 10-13, 2016 (See IDS Aug. 17, 2023) (Year: 2016).*

You et al., "ATSC 3.0 ROUTE/DASH Signaling for Immersive Media: New Perspectives and Examples", IEEE Access, Dec. 21, 2021, pp. 164503-164509, vol. 9.

Niamut et al., "MPEG DASH SRD—Spatial Relationship Description", May 2016, 8 total pages.

D'Acunto et al., "Using MPEG DASH SRD for zoomable and navigable video", May 2016, 4 total pages.

You, "MPEG-DASH MPD Signaling for Zoomable Stereo 360VR Videos", 3 total pages.

* cited by examiner

```
<Period>
<!--Right HD(BL_0) 360Video of spatial set id=0>
<AdaptationSet id="Right Tile 0 Set 0">
<SupplementalProperty schemeIdUri="urn:mpeg:dash:srd:2014"
value="0,0,640,360,1280,720,0"/>
<Representation id="Right_nHD_0_Set_0" width="640" height="360"..>
<BaseURL>Right_nHD_0_Set_0.mp4</BaseURL>
</Representation>
</Adaptation>
<AdaptationSet id="Right Tile 1 Set 0">
<SupplementalProperty schemeIdUri="urn:mpeg:dash:srd:2014"
value="0,640,0,640,360,1280,720,0"/>
<Representation id="Right_nHD_1_Set_0" width="640" height="360"...>
<BaseURL>Right_nHD_1.mp4</BaseURL>
</Representation>
</Adaptation>
:;
<!--Left QHD(BL_0+EL_0) 360Video of spatial set id=0>
<AdaptationSet id="Left Tile 0 Set 0">
<SupplementalProperty schemeIdUri="urn:mpeg:dash:srd:2014"
value="1,0,0,1280,720,2560,1440,0"/>
<EssentialProperty value="Right_Tile_0_Set_0"
schemeIdUri=http://dashif.org/guidelines/dash-atsc-videoposition/>
<Representation id="Left_HD_0_Set_0" width="1280" height="720"
dependencyID="Right_nHD_0_set_0"...>
<BaseURL>Left_HD_0_Set_0.mp4</BaseURL>
</Representation>
</Adaptation>
<!--The case of spatial set id=1 and spatial set id=2>
:;
</Period>
```

320
321
322
330
331
340
310

FIG. 3

Start

410
Receive MPD information including information on video bit streams obtained by encoding each piece of video data under different conditions 420
Decode video bit stream corresponding to communication environment of client device based on MPD information and output streaming video 430
Receive user's resizing input for streaming video 440
Decode video bit stream corresponding to resizing input and output adjusted streaming video End

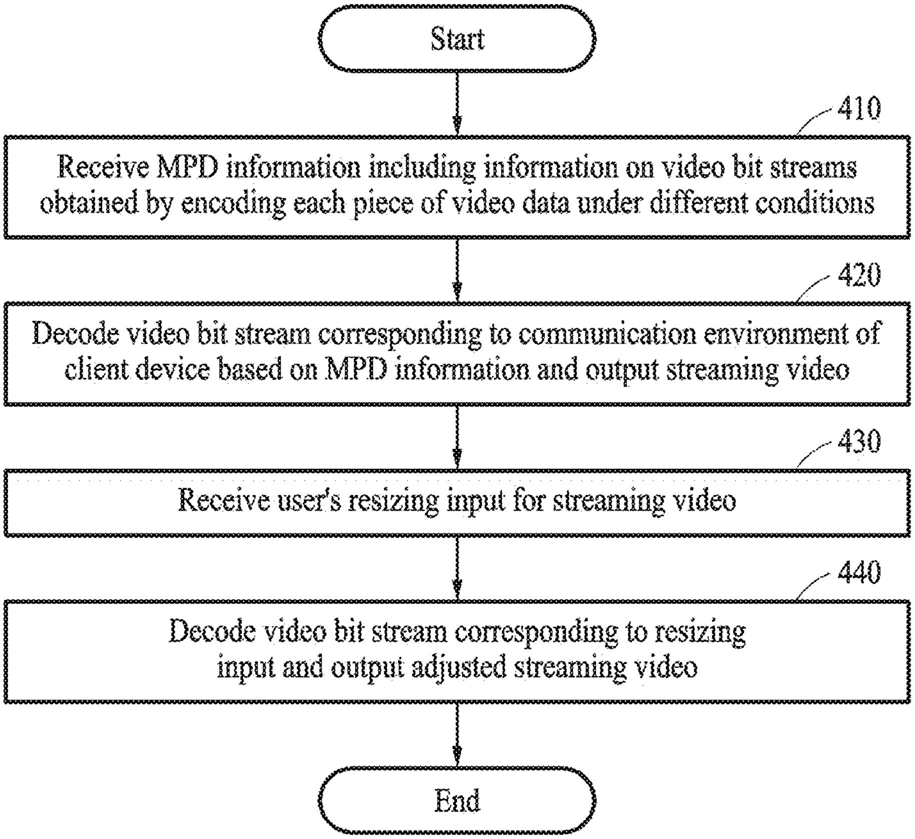

| Memory 510 | Processor 530 |

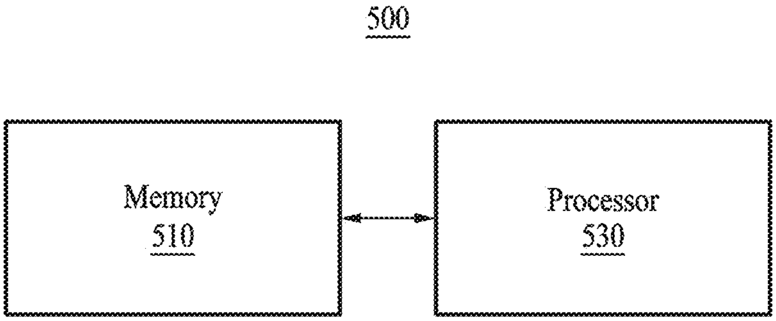

FIG. 5

METHOD, APPARATUS, AND SYSTEM FOR PROVIDING ZOOMABLE STEREO 360 VIRTUAL REALITY VIDEO

CROSS-REFERENCE TO RELATED APPLICATION

This application claims the benefit of Korean Patent Application No. 10-2022-0143033 filed on Oct. 31, 2022, in the Korean Intellectual Property Office, the entire disclosure of which is incorporated herein by reference for all purposes.

BACKGROUND

1. Field of the Invention

One or more embodiments relate to a method, apparatus, and system for providing a zoomable stereo 360 virtual reality (VR) video.

2. Description of the Related Art

Recently, with the development of devices such as smartphones, social interest in virtual reality (VR) technology has been increasing. VR technology is technology that may help overcome the difference between reality and virtual systems by increasing the fidelity of the representation of a simulated object and is one of the technologies that are attracting attention recently as technology that may overcome the limitations of existing technologies.

360 VR content may be provided through a network based on moving picture experts group (MPEG)-dynamic adaptive streaming over HTTP (DASH). MPEG-DASH is an adaptive bitrate streaming technique that enables web servers using a Hypertext Transport Protocol (HTTP) technique to stream media data over the Internet. MPEG-DASH is supported by streaming platforms such as Netflix and YouTube.

The above description has been possessed or acquired by the inventor(s) in the course of conceiving the present disclosure and is not necessarily an art publicly known before the present application is filed.

SUMMARY

When each of the pieces of media presentation description (MPD) information needs to be used to apply a plurality of functions (e.g., stereo 3D, 360 virtual reality (VR), scalability, and zoom in/out) to a streaming video, it results in inefficiencies and inconveniences. Technology for supporting a plurality of functions applicable to a streaming video based on one piece of MPD information may be required.

Embodiments support a plurality of functions (e.g., stereo 3D of a video, 360 VR, scalability, and zoom in/out) applicable to a streaming video, based on one piece of MPD information.

Embodiments improve the user experience of a real-time streaming service by selectively applying at least some of the plurality of functions to a streaming video according to the performance of a client terminal and circumstances.

However, the technical aspects are not limited to the aforementioned aspects, and other technical aspects may be present.

According to an aspect, there is provided a method of providing a video including receiving MPD information including information on video bit streams obtained by encoding each piece of video data by different conditions, decoding a video bit stream corresponding to a communication environment of a client device based on the MPD information and outputting a streaming video, receiving a user's resizing input for the streaming video, and decoding a video bit stream corresponding to the resizing input and outputting an adjusted streaming video.

Each of the streaming video and the adjusted streaming video may include a video set including a left eye video and a right eye video.

The left eye video and the right eye video may each have a different resolution based on scalable high efficiency video coding (SHVC).

The left eye video and the right eye video may each include a tile that divides a space of a video based on high efficiency video coding (HEVC) and may each include a same number of tiles.

A first video set included in the streaming video and a second video set included in the adjusted streaming video may be classified by an ID value of a spatial relationship description (SRD) included in the MPD information.

A first video set included in the streaming video and a second video set included in the adjusted streaming video may each correspond to a different resolution layer.

A number of tiles in videos included in a first video set included in the streaming video may be different from a number of tiles in videos included in a second video set included in the adjusted streaming video.

According to another aspect, there is provided a video providing apparatus including a memory including instructions and a processor electrically connected to the memory and configured to execute the instructions, wherein, when the instructions are executed by the processor, the processor is configured to perform a plurality of operations. The plurality of operations may include receiving MPD information including information on video bit streams obtained by encoding each piece of video data by different conditions, decoding a video bit stream corresponding to a communication environment of a client device based on the MPD information and outputting a streaming video, receiving a user's resizing input for the streaming video, and decoding a video bit stream corresponding to the resizing input and outputting an adjusted streaming video.

Each of the streaming video and the adjusted streaming video may include a video set including a left eye video and a right eye video.

The left eye video and the right eye video may each have a different resolution based on SHVC.

The left eye video and the right eye video may each include a tile that divides a space of a video based on HEVC and may each include a same number of tiles.

A first video set included in the streaming video and a second video set included in the adjusted streaming video may be classified by an ID value of an SRD included in the MPD information.

A first video set included in the streaming video and a second video set included in the adjusted streaming video may each correspond to a different resolution layer.

A number of tiles in videos included in a first video set included in the streaming video may be different from a number of tiles in videos included in a second video set included in the adjusted streaming video.

According to another aspect, there is provided a video providing system including a server configured to transmit MPD information including information on video bit streams obtained by encoding each piece of video data by different conditions and the video bit streams and a client device configured to selectively receive the MPD information and the video bit streams and output a video, the client device including a memory including instructions and a processor electrically connected to the memory and configured to execute the instructions, wherein, when the instructions are executed by the processor, the processor is configured to perform a plurality of operations. The plurality of operations may include decoding a video bit stream corresponding to a communication environment of the client device based on the MPD information and outputting a streaming video, receiving a user's resizing input for the streaming video, and decoding a video bit stream corresponding to the resizing input and outputting an adjusted streaming video.

Each of the streaming video and the adjusted streaming video may include a video set including a left eye video and a right eye video.

A first video set included in the streaming video and a second video set included in the adjusted streaming video may be classified by an ID value of an SRD included in the MPD information.

A first video set included in the streaming video and a second video set included in the adjusted streaming video may each correspond to a different resolution layer.

A number of tiles in videos included in a first video set included in the streaming video may be different from a number of tiles in videos included in a second video set included in the adjusted streaming video.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is an example of media presentation description (MPD) information according to an embodiment;

FIG. 4 is a flowchart illustrating a method of providing a video according to an embodiment; and FIG. 5 is a block diagram illustrating a video providing apparatus according to an embodiment.

DETAILED DESCRIPTION

Figure 1:
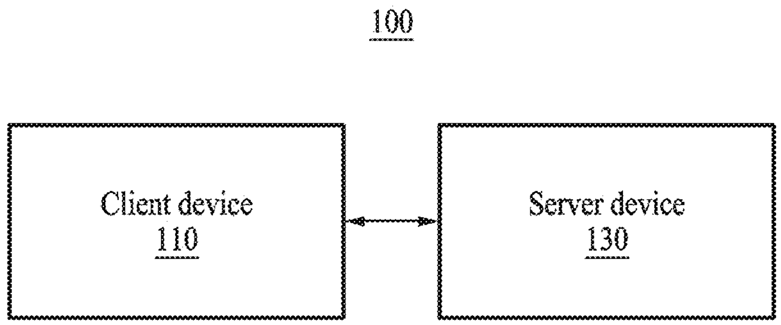
FIG. 1 is a block diagram schematically illustrating a video providing system according to an embodiment.

The following structural or functional descriptions of embodiments described herein are merely intended for the purpose of describing the embodiments described herein and may be implemented in various forms. Thus, actual form of implementation is not limited to the embodiments described herein, and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, and similarly, the second component may be referred to as the first component within the scope of the present disclosure.

When it is mentioned that one component is "connected" to another component, it may be understood that the one component is directly connected or coupled to another component or still another component is interposed between the two components.

As used herein, the singular forms "a," "an," and "the" are intended to include the plural forms as well, unless the context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. It will be further understood that the terms "include," "comprise," and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

The term "module" used in this document may include a unit implemented in hardware, software, or firmware, and may be used interchangeably with terms such as logic, logic block, component, or circuit. A module may be an integrally constructed component or a minimal unit of the component or part thereof that performs at least one function. For example, according to an embodiment, the module may be implemented as an application-specific integrated circuit (ASIC).

The term "unit" used in this document may refer to software or a hardware component such as a field programmable gate array (FPGA) or an ASIC, and "unit" may perform predetermined roles. However, "unit" is not limited to software or hardware. "Unit" may be configured to be in an addressable storage and may be configured to operate at least one processor. For example, "unit" may include components such as software components, object-oriented software components, class components, and task components, processes, functions, properties, procedures, subroutines, segments of program code, drivers, firmware, microcode, circuitry, data, database, data structures, tables, arrays, and variables. A function provided within the components and "units" may be combined with a smaller number of components and "units" or further divided into additional components and "units." In addition, the components and "units" may also be implemented to operate at least one central processing unit (CPU) in a device or a secure multimedia card. In addition, "unit" may include at least one processor.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a block diagram schematically illustrating a video providing system according to an embodiment.

A stereo 360 virtual reality (VR) video providing system 100 (hereinafter, referred to as a "video providing system 100") may support a plurality of functions (e.g., stereo 3D of a video, 360 VR, scalability, and zoom in/out) applicable to a streaming video, based on one piece of media presentation description (MPD) information.

The video providing system 100 may improve the user experience of a real-time streaming service by selectively applying at least some of the plurality of functions to a streaming video according to the performance of a client terminal and circumstances.

The video providing system 100 may utilize fewer bits to reach a target picture quality in a limited bitrate environment, and may be utilized to improve 3D-UHD broadcast picture quality.

Referring to FIG. 1, the video providing system 100 may include a client device 110 and a server device 130.

The server device 130 may transmit MPD information including information on video bit streams obtained by encoding each piece of video data under different conditions and the video bit streams. The client device 110 may selectively receive the MPD information and the video bit streams and output a video (e.g., a 360 VR streaming video).

The client device 110 may be implemented in a personal computer (PC), a data server, or a portable device.

The portable device may be implemented as, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. The smart device may be implemented as, for example, a smartwatch, a smart band, or a smart ring.

The client device 110 may receive the MPD information including information on video bit streams obtained by encoding each piece of video data under different conditions. The client device 110 may decode a video bit stream corresponding to a communication environment of the client device 110 based on the MPD information and output a streaming video. The client device 110 may receive a user's resizing input for the streaming video. The client device 110 may decode a video bit stream corresponding to the resizing input and output an adjusted streaming video.

Each of the streaming video and the adjusted streaming video may include a video set (e.g., a video set including a left eye video and a right eye video). The left eye video and the right eye video may each have a different resolution based on scalable high efficiency video coding (SHVC). For example, the left eye video may have a higher resolution than the right eye video. The left eye video and the right eye video may each include the same number of tiles (e.g., tiles that divide a space of a video based on high efficiency video coding (HEVC)).

A first video set included in the streaming video and a second video set included in the adjusted streaming video may each correspond to a different resolution layer. An example of this is described below in detail with reference to FIGS. 2A and 2B.

The first video set included in the streaming video and the second video set included in the adjusted streaming video may be classified by an ID value of a spatial relationship description (SRD) included in the MPD information. The ID value of the SRD is described below in detail with reference to FIG. 3.

Videos included in the first video set included in the streaming video may have a different number of tiles from videos included in the second video set included in the adjusted streaming video.

The video providing system 100 may provide next-generation immersive media services on a rapidly growing over-the-top (OTT) platform. The video providing system 100 may use the MPD information derived through the convergence of a signaling technique for SHVC-based stereo 360 VR transmission and an SRD signaling technique. The video providing system 100 may support a plurality of functions (e.g., stereo 3D of a video, 360 VR, scalability, and zoom in/out) applicable to a streaming video, based on one piece of MPD information. The video providing system 100 may support zooming in/out in real time even while a user is streaming.

The video providing system 100 may be compatible not only with the OTT platform supporting moving picture experts group (MPEG)-dynamic adaptive streaming over HTTP (DASH) but also with the advanced television systems committee (ATSC) 3.0 real-time object delivery over unidirectional transport (ROUTE)/DASH standard, which is the next-generation North American broadcasting standard, and may provide stereo 3D, 360 VR, scalability, and a video expansion/reduction (zoom in/out) function.

Figure 2A:
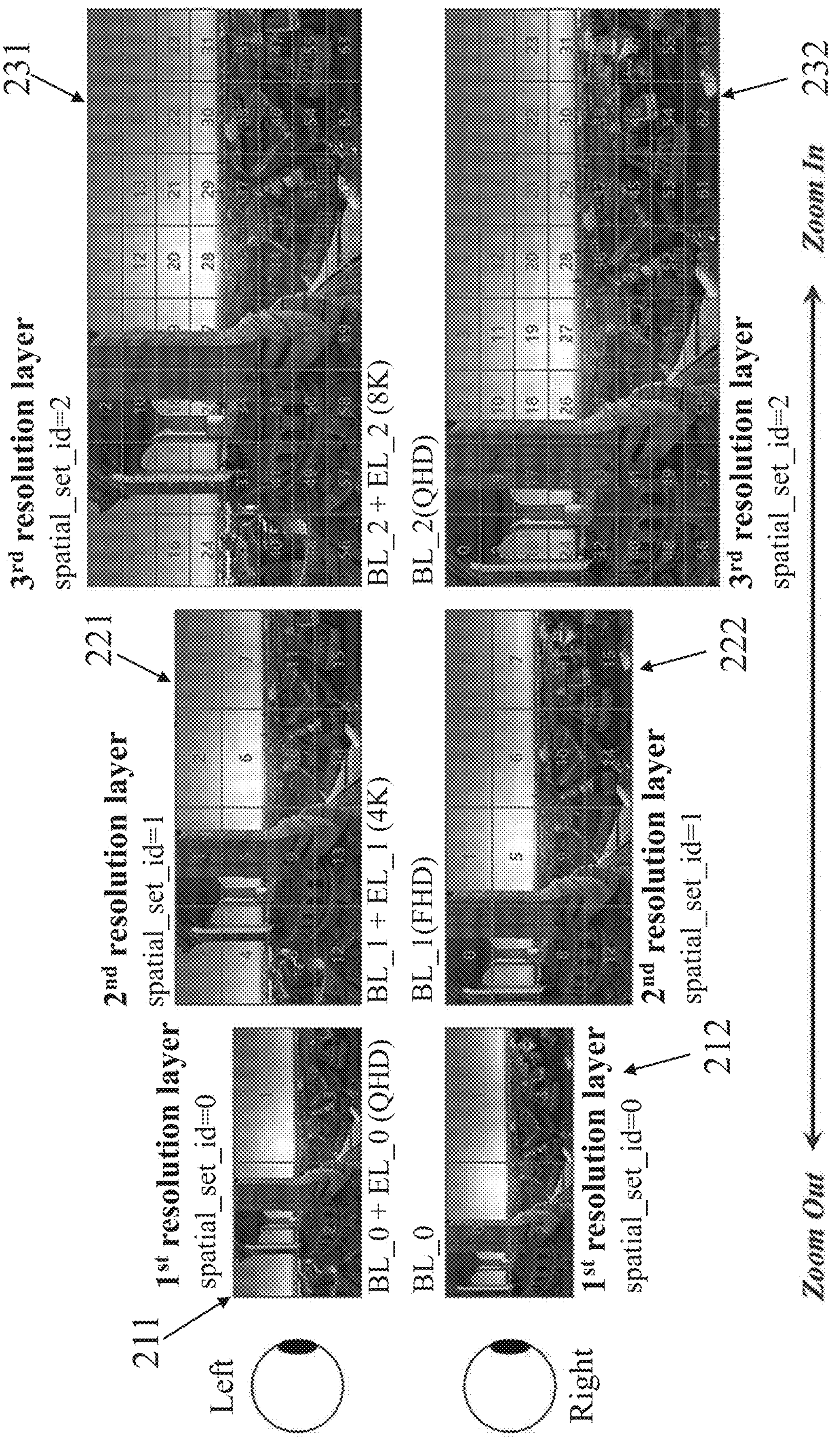
FIGS. 2A and 2B are diagrams illustrating adjustment of a streaming video according to an embodiment.
Figure 2B:
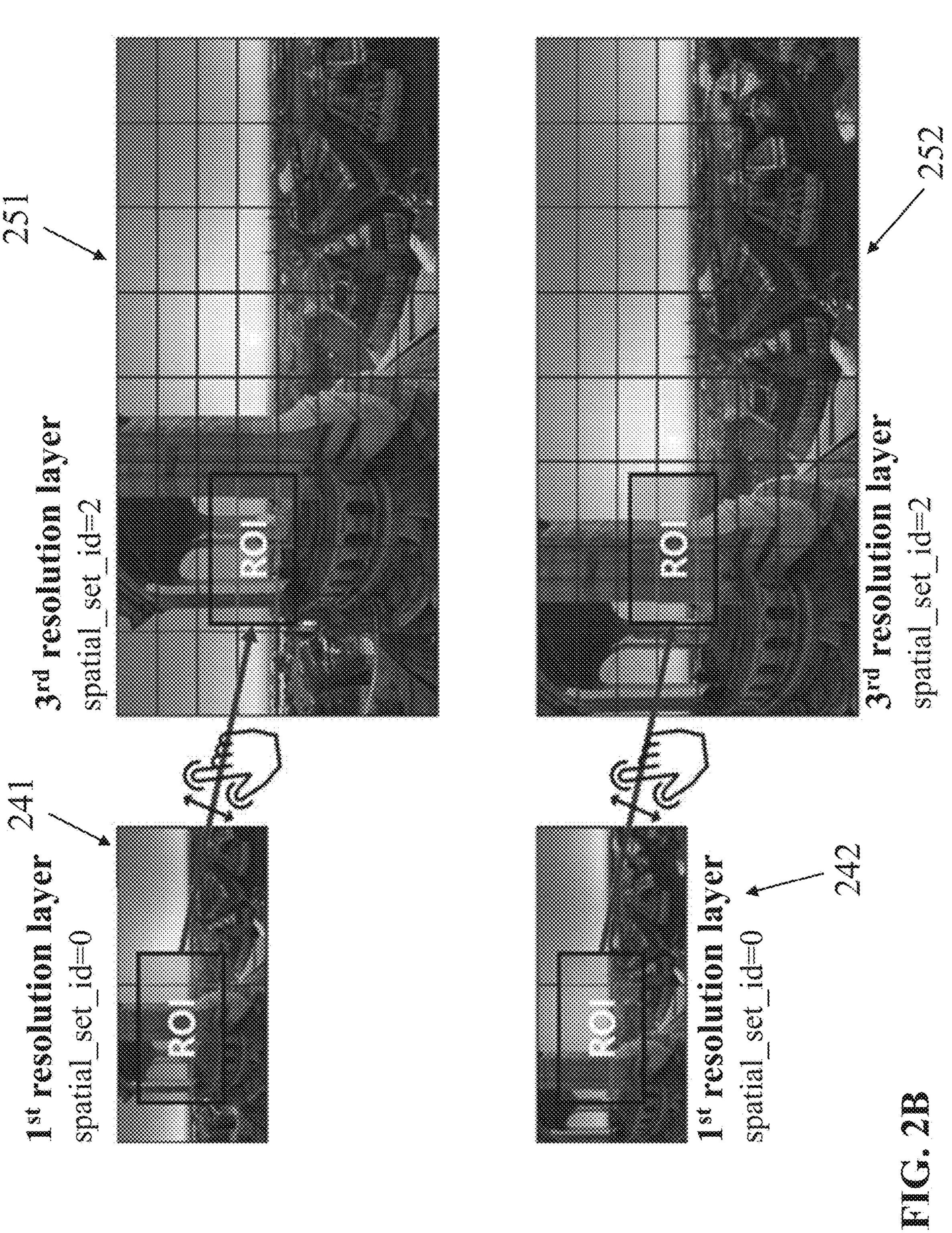

FIGS. 2A and 2B are diagrams illustrating adjustment of a streaming video according to an embodiment.

Referring to FIG. 2A, examples of video sets 211-212, 221-222, and 231-232 including a left eye video (e.g., 211) and a right eye video (e.g., 212), the video sets included in a streaming video that is output to a user, may be checked.

The left eye video (e.g., 211) and the right eye video (e.g., 212) included in the video set (e.g., 211-212) may represent videos projected from 3D to 2D by an equirectangular projection (ERP) technique.

The left eye video (e.g., 211) and the right eye video (e.g., 212) included in the video set (e.g., 211-212) may each have a different resolution based on SHVC. For example, the left eye video 211 may have a quad high definition (QHD) resolution and the right eye video 212 may have a high definition (HD) resolution.

The left eye video (e.g., 211) and the right eye video (e.g., 212) included in the video set (e.g., 211-212) may include the same number of tiles (e.g., tiles that divide a space of a video based on HEVC). For example, the left eye video 211 and the right eye video 212 included in the video set (e.g., 211-212) may each have four tiles.

The video set 211-212, the video set 221-222, and the video set 231-232 may each correspond to a different resolution layer. For example, the video set 211-212 may correspond to a first resolution layer, the video set 221-222 may correspond to a second resolution layer, and the video set 231-232 may correspond to a third resolution layer. The video set 211-212 may correspond to an ID value (e.g., 0) of an SRD included in MPD information, the video set 221-222 may correspond to an ID value (e.g., 1) of the SRD included in the MPD information, and the video set 231-232 may correspond to an ID value (e.g., 2) of the SRD included in the MPD information. Each of the video sets may correspond to an ID value (e.g., a spatial_set_id_value) of an SRD included in a piece of MPD information and may be classified by the spatial_set_id value.

Referring to FIG. 2B, an example before and after adjusting a streaming video may be checked. A client device (e.g., the client device 110 of FIG. 1 (e.g., a video providing apparatus)) may decode a video bit stream corresponding to the communication environment of the client device 110 and output a streaming video (e.g., a streaming video including a video set 241-242) to the user. The streaming video (e.g., the streaming video including the video set 241-242) may correspond to the first resolution layer. The streaming video (e.g., the streaming video including the video set 241-242)

may correspond to the ID value (e.g., the spatial_set_id value (e.g., 0)) of the SRD included in MPD information.

The client device 110 may receive a user's resizing input (e.g., an enlarging input) for the streaming video. The client device 110 may decode a video bit stream corresponding to the resizing input and output an adjusted streaming video (e.g., a streaming video including a video set 251-252). The adjusted streaming video (e.g., the streaming video including the video set 251-252) may correspond to the third resolution layer. The streaming video (e.g., the streaming video including the video set 251-252) may correspond to the ID value (e.g., the spatial_set_id value (e.g., 2)) of the SRD included in the MPD information.

The adjusted streaming video (e.g., the streaming video including the video set 251-252) may be an enlarged video compared to the streaming video (e.g., the streaming video including the video set 241-242). The adjusted streaming video (e.g., the streaming video including the video set 251-252) may have a higher resolution than the streaming video (e.g., the streaming video including the video set 241-242). The adjusted streaming video (e.g., the streaming video including the video set 251-252) may have a larger number of tiles than the streaming video (e.g., the streaming video including the video set 241-242).

The adjusted streaming video (e.g., the streaming video including the video set 251-252) and the streaming video (e.g., the streaming video including the video set 241-242) may be classified by the ID value (e.g., the spatial_set_id value) of the SRD included in the MPD information.

FIG. 3 is an example of MPD information according to an embodiment.

The MPD information may be generated by an MPD signaling of a server device (e.g., the server device 130 of FIG. 1). The MPD information may include tiling information, stereoscopic pair information, and/or resolution layer information.

The tiling information may include an SRD indicating the viewpoint and position between the tiles of a captured left eye video and a captured right eye video. The SRD of each tile may be a component that may be independently coded and decoded and may be expressed as an AdaptationSet. The SRD may be specified with a schemeIdUri and a value using SupplementalProperty in each AdaptationSet. In a decoding process, whether a tile is a tile, the position of the tile, and the viewpoint may be identified by the schemeIdUri and the value in the corresponding AdaptationSet.

The schemeIdUri of the SRD may be "urn:m.peg:dash:srd:2014," and the value of the SRD may be expressed as "source_id, object_x, object_y, object_width, object_height, total_width, total_height, spatial_set_id", which may respectively correspond to a tile ID, the horizontal position and vertical position of the top left corner, the width and height of the tile, the width and height of an original video, and resolution layer information (e.g., an ID of a grouped tile).

For a stereoscopic UHD 360-degree VR broadcasting service, the MPD information may include a stereoscopic pair ID for the left eye video and the right eye video. That is, the stereoscopic pair ID between the left eye video (or tile) and the right eye video (or tile) may be expressed as an EssentialProperty of the MPD information. An EssentialProperty value must be identical to an AdaptationSet ID in the right eye video included in a stereoscopic pair.

Referring to FIG. 3, in a part 310 of the MPD information, tiling information on tiles included in a video set (e.g., a video set including a left eye video and a right eye video) corresponding to the first resolution layer (e.g., spatial_set_ID=0) may be checked.

A line 320 included in the part 310 of the MPD information may indicate a right eye video included in a video set corresponding to the first resolution layer (e.g., spatial_set_ID=0). A set of lines 321 may include information on a first tile (e.g., Right_Tile_0_Set_0) included in the right eye video. A set of lines 322 may include information on a second tile (e.g., Right_Tile_1_Set_0) included in the right eye video. Although only information on the first tile and the second tile is shown in FIG. 3, embodiments are not limited thereto, and information on all tiles dividing the space of the right eye video corresponding to the first resolution layer (e.g., spatial_set_ID=0) may be included in the part 310 of the MPD information.

A line 330 included in the part 310 of the MPD information may indicate a left eye video included in the video set corresponding to the first resolution layer (e.g., spatial_set_ID=0). A set of lines 331 may include information on a first tile (e.g., Left_Tile_0_Set_0) included in the left eye video. Although only information on the first tile is shown in FIG. 3, embodiments are not limited thereto, and information on all tiles dividing the space of the left eye video corresponding to the first resolution layer (e.g., spatial_set_ID=0) may be included in the part 310 of the MPD information.

A line 340 may indicate video sets (e.g., video sets including a left eye video and a right eye video) that respectively correspond to the second resolution layer (e.g., spatial_set_ID=1) and the third resolution layer (e.g., spatial_set_ID=2). Since the description of the second resolution layer and the third resolution layer is substantially similar to that of the first resolution layer described above, a detailed description thereof is omitted. As described above, all information related to video sets corresponding to each of the resolution layers may be included in a piece of MPD information generated through one MPD signaling.

The video providing system (e.g., the video providing system 100 of FIG. 1) may support a plurality of functions (e.g., stereo 3D of a video, 360 VR, scalability, and zoom in/out) applicable to a streaming video, based on one piece of MPD information.

FIG. 4 is a flowchart illustrating a method of providing a video according to an embodiment.

Referring to FIG. 4, according to an embodiment, operations 410 to 440 may be sequentially performed, however, embodiments are not limited thereto. For example, two or more operations may be performed in parallel.

In operation 410, a client device (e.g., the client device 110 of FIG. 1) may receive MPD information including information on video bit streams obtained by encoding each piece of video data under different conditions.

In operation 420, the client device 110 may decode a video bit stream corresponding to the communication environment of the client device 110 based on the MPD information and output a streaming video.

In operation 430, the client device 110 may receive a user's resizing input for the streaming video.

In operation 440, the client device 110 may decode a video bit stream corresponding to the resizing input and output an adjusted streaming video.

FIG. 5 is a block diagram illustrating a video providing apparatus according to an embodiment.

The client device 500 (e.g., the client device 110 of FIG. 1 (e.g., a video providing apparatus) may provide a plurality of functions (e.g., stereo 3D of video, 360 VR, scalability, zoom in/out) applicable to a streaming video, based on one piece of MPD information.

The client device 500 may improve the user experience of a real-time streaming service by selectively applying at least some of the plurality of functions to a streaming video according to the performance of a client terminal and circumstances.

Referring to FIG. 5, a client device 500 may include a memory 510 and a processor 530.

The memory 510 may be implemented as a volatile memory device or a non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, a molecular electronic memory device, or insulator resistance change memory.

The processor 530 may process data stored in the memory 510. The processor 530 may execute computer-readable code (e.g., software) stored in the memory 510 and instructions triggered by the processor 530.

The processor 530 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

An operation performed by the processor 530 may be substantially the same as the operation of the client device described above with reference to FIGS. 1 to 5. Accordingly, a detailed description thereof is omitted.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using hardware components, software components, or a combination thereof. For example, a device, a method, and a component described in the examples may be implemented using one or more general-purpose or special-purpose computers, such as, for example, a processor, a controller, an arithmetic logic unit (ALU), a digital signal processor, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of the processing device is used as singular. However, one skilled in the art will appreciate that the processing device may include multiple processing elements and multiple types of processing elements. For example, the processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording media.

The method according to the above-described embodiments may be recorded in non-transitory computer-readable media including program instructions to implement various operations which may be performed by a computer. The media may also include the program instructions, data files, data structures, and the like alone or in combination. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as code produced by a compiler, and higher-level code that may be executed by the computer using an interpreter.

The above-described hardware devices may be configured to act as one or more software modules in order to perform the operations of the above-described embodiments, or vice versa.

While this disclosure includes embodiments illustrated with reference to limited drawings, it will be apparent to one of ordinary skill in the art that various changes in form and details may be made in these embodiments without departing from the spirit and scope of the claims and their equivalents. Descriptions of features or aspects in each embodiment are to be considered as being applicable to similar features or aspects in other embodiments. Suitable results may be achieved if the described techniques are performed in a different order, and/or if components in a described system, architecture, device, or circuit are coupled or combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing a video, the method comprising:

receiving one piece of media presentation description (MPD) information comprising information on video bit streams obtained by encoding each piece of video data by different conditions;

decoding a video bit stream corresponding to a communication environment of a client device based on the one piece of MPD information and outputting a streaming video;

receiving a user's resizing input for the streaming video; and decoding a video bit stream corresponding to the resizing input and outputting an adjusted streaming video, wherein the user's resizing input corresponded to the ID value of a spatial relationship description (SRD) included in the MPD information.

2. The method of claim 1, wherein each of the streaming video and the adjusted streaming video comprises a video set comprising a left eye video and a right eye video.

3. The method of claim 2, wherein the left eye video and the right eye video each have a different resolution based on scalable high efficiency video coding (SHVC).

4. The method of claim 2, wherein the left eye video and the right eye video each comprise a tile that divides a space of a video based on high efficiency video coding (HEVC) and each comprise a same number of tiles.

5. The method of claim 1, wherein a first video set included in the streaming video and a second video set included in the adjusted streaming video are classified by an ID value of the SRD included in the one piece of MPD information.

6. The method of claim 1, wherein a first video set included in the streaming video and a second video set included in the adjusted streaming video each correspond to a different resolution layer.

7. The method of claim 1, wherein a number of tiles in videos included in a first video set included in the streaming video is different from a number of tiles in videos included in a second video set included in the adjusted streaming video.

8. A video providing apparatus, the apparatus comprising:

a memory comprising instructions; and a processor electrically connected to the memory and configured to execute the instructions, wherein, when the instructions are executed by the processor, the processor is configured to perform a plurality of operations, wherein the plurality of operations comprises:

receiving one piece of media presentation description (MPD) information comprising information on video bit streams obtained by encoding each piece of video data by different conditions;

decoding a video bit stream corresponding to a communication environment of a client device based on the one piece of MPD information and outputting a streaming video;

receiving a user's resizing input for the streaming video; and decoding a video bit stream corresponding to the resizing input and outputting an adjusted streaming video, wherein the user's resizing input corresponded to the ID value of a spatial relationship description (SRD) included in the one piece of MPD information.

9. The apparatus of claim 8, wherein each of the streaming video and the adjusted streaming video comprises a video set comprising a left eye video and a right eye video.

10. The apparatus of claim 9, wherein the left eye video and the right eye video each have a different resolution based on scalable high efficiency video coding (SHVC).

11. The apparatus of claim 9, wherein the left eye video and the right eye video each comprise a tile that divides a space of a video based on high efficiency video coding (HEVC) and each comprise a same number of tiles.

12. The apparatus of claim 8, wherein a first video set included in the streaming video and a second video set included in the adjusted streaming video are classified by an ID value of the SRD included in the one piece of MPD information.

13. The apparatus of claim 8, wherein a first video set included in the streaming video and a second video set included in the adjusted streaming video each correspond to a different resolution layer.

14. The apparatus of claim 8, wherein a number of tiles in videos included in a first video set included in the streaming video is different from a number of tiles in videos included in a second video set included in the adjusted streaming video.

15. A video providing system, the system comprising:

a server configured to transmit media presentation description (MPD) information comprising information on video bit streams obtained by encoding each piece of video data by different conditions and the video bit streams; and a client device configured to selectively receive one piece of MPD information and the video bit streams and output a video, the client device comprising:

a memory comprising instructions; and a processor electrically connected to the memory and configured to execute the instructions, wherein, when the instructions are executed by the processor, the processor is configured to perform a plurality of operations, wherein the plurality of operations comprises:

decoding a video bit stream corresponding to a communication environment of the client device based on the one piece of MPD information and outputting a streaming video;

receiving a user's resizing input for the streaming video; and decoding a video bit stream corresponding to the resizing input and outputting an adjusted streaming video, wherein the user's resizing input corresponded to the ID value of a spatial relationship description (SRD) included in the one piece of MPD information.

16. The system of claim 15, wherein each of the streaming video and the adjusted streaming video comprises a video set comprising a left eye video and a right eye video.

17. The system of claim 15, wherein a first video set included in the streaming video and a second video set included in the adjusted streaming video are classified by an ID value of the SRD included in the one piece of MPD information.

18. The system of claim 15, wherein a first video set included in the streaming video and a second video set included in the adjusted streaming video each correspond to a different resolution layer.

19. The system of claim 15, wherein a number of tiles in videos included in a first video set included in the streaming video is different from a number of tiles in videos included in a second video set included in the adjusted streaming video.

* * * * *